United States Patent [19]

Heibein et al.

[11] 4,321,607

[45] Mar. 23, 1982

[54] SCALING AERODYNAMIC COMPENSATION IN AN INK JET PRINTER

[75] Inventors: Harry P. Heibein, Longmont; Chein-Hwa S. Tsao, Boulder, both of Colo.

[73] Assignee: International Business Machines Corporation, Armonk, N.Y.

[21] Appl. No.: 160,339

[22] Filed: Jun. 17, 1980

[51] Int. Cl.³ .......... G01D 15/18

[52] U.S. Cl. .......... 346/75; 346/140 R

[58] Field of Search .......... 346/1, 75, 140 IJ

[56] References Cited

U.S. PATENT DOCUMENTS

| | | | |
|---|---|---|---|
| 3,631,511 | 12/1971 | Keur et al. | 346/75 |
| 3,789,422 | 1/1974 | Haskell et al. | 346/75 |
| 3,828,354 | 8/1974 | Hilton | 346/1 |
| 3,946,399 | 3/1976 | Zaretsky | 346/1 |
| 3,971,039 | 7/1976 | Takano et al. | 346/75 |
| 4,032,924 | 6/1977 | Takano et al. | 346/75 |
| 4,087,825 | 5/1978 | Chen et al. | 346/75 |
| 4,286,273 | 8/1981 | Horike | 346/75 |

OTHER PUBLICATIONS

E. E. Bengds et al., "Ink Printer Drop Deflection Programmable Waveform Synthesizer for Charge Compensation", *IBM Technical Disclosure Bulletin*, vol. 16, No. 11, Apr. 1974, pp. 3550-3552.

N. N. Nguyen, "Storing and Computing the Charge Electrode Voltage Data in a High-Speed Ink Jet Printer", *IBM Technical Disclosure Bulletin*, vol. 21, No. 4, Sep. 1978, pp. 1540-1542.

*Primary Examiner*—George H. Miller, Jr.

*Attorney, Agent, or Firm*—Homer L. Knearl

[57] ABSTRACT

In an ink jet printer, it is desirable to compensate the flight of the ink drops to correct for print errors caused by aerodynamic effects. The apparatus shown herein corrects the flight of ink drops for all aerodynamic effects, drop interactive and environmental. Correction for drop interactive effects can be accomplished in any of several well known ways. The additional correction for environmental effects is accomplished by scaling the drop interactive correction. The scale factor is first determined for static environmental conditions. Environmental conditions include the climate in which the printer operates and the specifications on the component parts of the ink jet printing assembly. The scale factor can be adjusted dynamically for changes in the environment. In particular, changes in air density of the environment are monitored and used to dynamically adjust the scale factor.

20 Claims, 9 Drawing Figures

SCALING AERODYNAMIC COMPENSATION IN AN INK JET PRINTER

FIELD OF THE INVENTION

This invention relates to correcting the flight path of ink drops in an ink jet printer to reduce print position errors. More particularly, the invention corrects the flight path for environmental effects that are independent of the print data pattern.

BACKGROUND ART

It has been found that aerodynamic compensation of ink drops in an ink jet printer for interactive effects alone is not enough for high quality printing. Typical drop interactive effects are charge repulsion between drops, charge induction between drops and aerodynamic drag. However, environmental effects independent of the drop interactions can also cause printing errors. These independent effects include such things as air pressure, air temperature, humidity, nozzle diameter, ink density, flight distance, angle of impact, charging channel width, and other physical characteristics of the environment of the ink stream.

There are numerous techniques for compensating an ink jet printer for drop interactive effects. U.S. Pat. Nos. 3,828,354, 3,946,399 and commonly assigned patent application Ser. No. 23,813, filed Mar. 26, 1979, all teach compensating for the error effects due to drop interactive effects. The Zaretsky U.S. Pat. No. 3,946,399 teaches monitoring the data pattern of an ink jet stream to detect particular print data patterns. These print data patterns are then logically analyzed to select a compensation charge signal to be applied to the charge electrode in the ink jet printer.

The Hilton U.S. Pat. No. 3,823,354 teaches monitoring a seven bit print data pattern to generate the compensation signal for aerodynamic and charge induced effects. Hilton monitors four drops ahead of the reference drop and two drops behind the reference drop and the reference drop itself. Based upon the binary pattern for these seven drops, Hilton addresses a read-only-store memory which contains predetermined compensation values for each possible address.

Patent application Ser. No. 23,813, monitors a large number of drops in the print data pattern to make more accurate compensation decisions. To keep the data processing manageable, only the closest drops to the drop being charged are monitored individually. The more remote drops are monitored as one or more groups of drops contributing a group effect to be compensated for.

None of the above patented techniques deal with the problem of compensating for environmental aerodynamic effects independent of drop interactions. In fact, all of the above techniques can be improved by use of the present invention to compensate environmental effects independent of the print data pattern.

It is known to compensate an ink jet printer for effects which are independent of the print data pattern. However, this has been done in a stationary print media environment where aerodynamic effects were of no consequence to the printing operation. An example is U.S. Pat. No. 3,971,039 issued to Takano et al. The Takano patent teaches varying the charge voltage or the deflection voltage used in a raster type ink jet printer in accordance with ink temperature. However, the patent is aimed at solving a different problem, height control of the raster pattern. Since the print medium does not move in the raster direction during printing of each raster scan, there are no aerodynamic effects causing drop flight time variations and thus print errors. The patent is only concerned about flight direction and not flight time of the drops.

If the print medium does move, an ink jet printer must correct for drop velocity variations and aerodynamic effects on the drops because flight time is a factor in print error. The present invention involves this type of printer, a printer where flight time is a factor. Drop velocity in such a printer is usually controlled by a drop velocity servo that controls ink pressure at the nozzle. These servos are well known and form no part of the present invention. The present invention is directed to solving the problem of print errors caused by aerodynamic effects where those effects are due to environmental effects as well as drop interactive effects.

SUMMARY OF THE INVENTION

It is an object of this invention to correct an ink jet printer for aerodynamic effects that vary as the environment of the ink stream varies.

It is a further object of this invention to correct for all aerodynamic effects whether they are due to environment or drop interactions.

In accordance with this invention, the above objects have been accomplished by setting the charge voltage for gutter drops (no-print drops) to maintain a predetermined distance between the flight path of print drops and gutter drops and thereafter by scaling the aerodynamic compensation voltage applied to the print drops to correct the flight path of print drops for environmental effects. The separation between the nominal flight path of print drops and the nominal flight path of gutter drops is observed, and a gutter reference signal level controlling the flight path of the gutter drops is adjusted to achieve the desired separation. Next, predetermined print patterns of the printer are observed, and a print reference signal level controlling the compensation of the flight path of the print drops is adjusted to correct for aerodynamic effects due to the environment.

The print reference signal level is the reference from which all the drop interactive aerodynamic compensation signals are derived. Thus, by adjusting the reference level for environmental effects, all of the compensation values for drop interactive effects are scaled in proportion to the environmental effects. Accordingly, all aerodynamic effects are compensated for by the present invention.

The print reference signal level is derived from the gutter reference signal level. This assures that even for maximum deflection of the print drops for compensation purposes, sufficient separation will be maintained between the trajectory of the print drops and the trajectory of the gutter drops. Also, the print reference signal and the gutter reference signal are adjusted separately so that the drop interaction compensation can be based on predetermined positions between the nominal flight path of print drops and the nominal flight path of gutter drops. Thereafter, the scaling of the compensation of the print drops for environmental effects can be accomplished without substantially altering the predetermined drop interaction effects between gutter drops and print drops.

Further, after the above static adjustment of the compensation values has been made, some environmental effects are monitored and the compensation of the flight path of the print drops is dynamically adjusted. For example, the air density is monitored by sensing temperature, pressure and humidity and the static, environmental compensation of the print drops is adjusted as the air density varies.

The great advantage of our invention is that it provides a very effective and inexpensive method for adjusting an ink jet printer in the field. This field adjustment can correct for variations in climate from the manufacturing site to the customer's office. It can also correct for variations in the flight path of the drops caused by manufacturing tolerances on the print head assembly such as nozzle size, charge electrode spacing, the deflection electrode spacing, ink density, flight distance to paper, and angle of impact of drops on paper.

DETAILED DESCRIPTION

Figure 1:
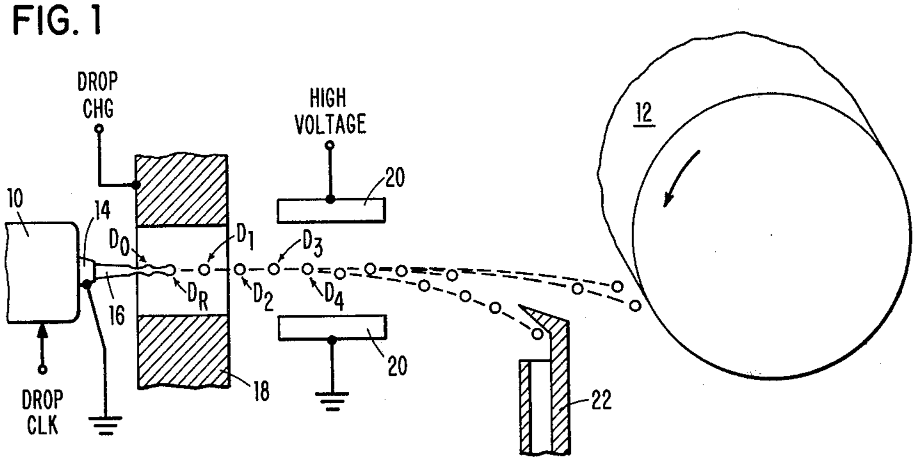
FIG. 1 shows an example of an ink jet printer.

In FIG. 1, ink jet head 10 is printing on a media mounted on drum 12. As drum 12 rotates, ink jet head 10 is indexed parallel to the axis of the drum so as to print the entire page mounted on the surface of drum 12. Ink in the head 10 is under pressure and issues from the nozzle 14 as an ink stream.

A piezoelectric crystal in the head 10 vibrates ink in the ink cavity inside the head. This vibration or pressure variation in the ink causes stream 16 to break into droplets. The piezoelectric crystal in head 10 is driven by a drop clock signal. The clock signal controls the frequency of the drop break-off.

A drop charging signal is applied to charge electrode 18. Charge electrode 18 is in the shape of a ring and surrounds the ink stream 16 at the point where the ink stream breaks into droplets. Nozzle 14 and ink 16 are electrically conductive. With nozzle 14 grounded and a voltage on charge ring 18, electrical charges will be induced and trapped on an ink droplet as it breaks off from the stream 16.

As the droplets fly forward, they pass through an electric field provided by the deflection electrodes 20. If the drops carry a charge, they are deflected by the electric field between electrodes 20. Highly charged drops are deflected into a gutter 22, while drops with little or no charge fly past the gutter to print a dot on the media carried by drum 12. Ink caught by gutter 22 may be recirculated to the ink system supplying ink to head 10.

The printer depicted in FIG. 1 is a binary ink jet printer. If it is desired to print a drop on the paper carried by drum 12, the drop is substantially uncharged. If the drop is not to be printed on the paper, a gutter voltage is applied to the charge electrode 18, and the drop is charged sufficiently so that it will be deflected by the deflection electrodes 20 into the gutter 22. If there were no aerodynamic error effects, the print drops would be completely uncharged. However, because of the aerodynamic effects, a compensation charge is applied to the print drops. This compensation charge varies from print drop to print drop depending upon the correction required to obtain the proper flight path of the drop to the media mounted on drum 12.

Figure 2:
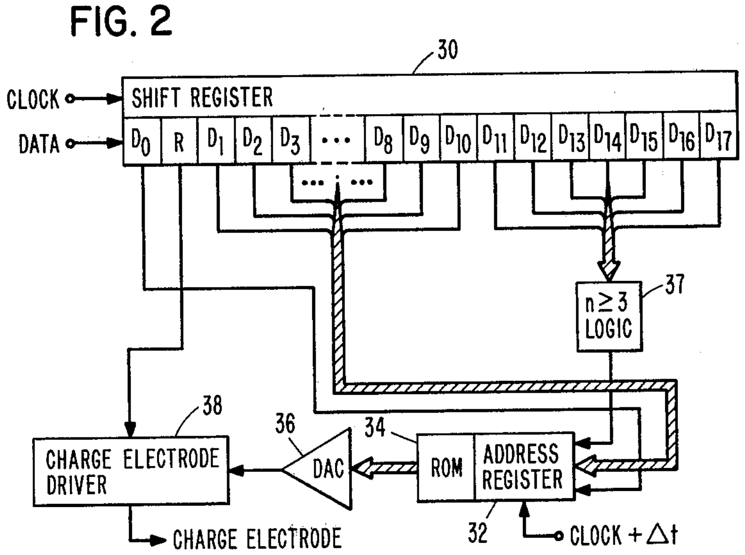
FIG. 2 shows an example of compensation signal generating apparatus which may be used with the printer of FIG. 1.

One example of apparatus to generate the charge electrode signal is shown in FIG. 2. Print data for drops in the ink stream are buffered in shift register 30. The shift register contains 19 stages. The drop being charged or the reference drop is denoted as the R stage. The 17 drops preceding the reference drop are denoted as $D_1$ through $D_{17}$. The drop trailing the reference drop is denoted $D_0$. Trailing drop $D_0$ and preceding drops $D_1$ through $D_{10}$ are applied directly to address register 32 of read only memory 34. Drops $D_{11}$ through $D_{17}$ are analyzed by logic 37. Logic 37 generates a binary "1" if 3 or more of the droplets $D_{11}$ through $D_{17}$ are print drops, i.e., binary "1" stored in at least three of the shift register positions $D_{11}$ through $D_{17}$.

Shift register 30 is shifted at the beginning of each drop clock cycle. Shortly thereafter (clock+$\Delta$t) the values from shift register 30 and logic 37 are loaded into address register 32. Thus, address register 32 is loaded with a new address prior to the break-off time of the ink droplet to be charged. The compensation value retrieved by the address in the address register is a 9-bit value which is passed to the digital-to-analog converter 36. The nine bits can then be converted by converter 36 to one of 512 analog values. These analog compensation values are amplified by the charge electrode driver 38 and applied to the charge electrode 18 (FIG. 1).

Figure 3:
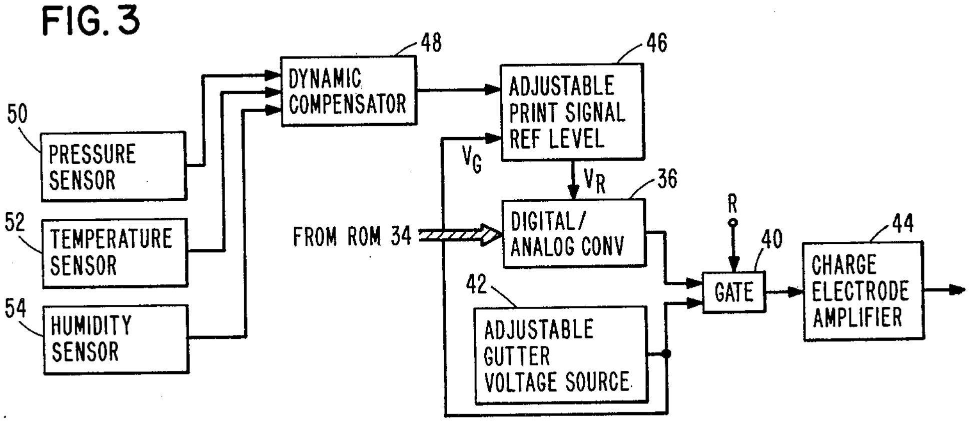
FIG. 3 shows the charge electrode driver of FIG. 2 including apparatus to adjust the printer to correct for all aerodynamic effects whether caused by drop interactions or environmental effects.

The details of the charge electrode driver 38 and its connection to the R-bit of shift register 30 and the digital-to-analog converter 36 are shown in FIG. 3. The R-bit controls gate 40 to select whether the gutter voltage from adjustable gutter voltage source 42 or the compensation value from converter 36 are passed to the charge electrode amplifier 44. If the R-bit is a "1" denoting a print drop, then the compensation value from the digital-to-analog converter 36 is passed to the charge electrode amplifier 44. If the R-bit is a "0", the gutter voltage is passed from the adjustable gutter voltage source 42 to the charge electrode amplifier 44.

As discussed earlier, the only voltage used to charge a print drop is the compensation voltage. Digital-to-analog converter 36 generates a compensation voltage based upon drop interaction effects from the digital value it receives from ROM 34. The drop interactive compensation value is scaled by changing the reference signal $V_R$ into converter 36. The reference signal is provided by the adjustable print signal reference level source 46. In effect, by adjusting the reference level $V_R$ out of source 46, all of the compensation values out of the digital-to-analog converter 36 are scaled.

Reference level $V_R$ is derived from the gutter voltage $V_G$. Once the gutter voltage has been adjusted, then the reference level may be adjusted relative to the gutter voltage. The manner in which these adjustments are made will be described hereinafter.

An additional input to the adjustable print signal reference level source 46 is a dynamic compensation signal from compensator 48. Dynamic compensator 48 monitors the environmental factors of air pressure, air temperature and humidity to generate an environmental compensation factor based upon the air density. The adjustable reference source 46 then responds dynamically to adjust the reference level $V_R$ as a function of changes in air density.

A static adjustment for environmental effects is made at the time the printer is set up at a field location. These adjustments will be described shortly hereinafter. They involve observations by the customer engineer as he installs the printer. The adjustments are made to the gutter voltage source 42 and the print signal reference level source 46. Thereafter, dynamic adjustments for changes in air density are automatically made by the reference level source 46.

Figure 4:
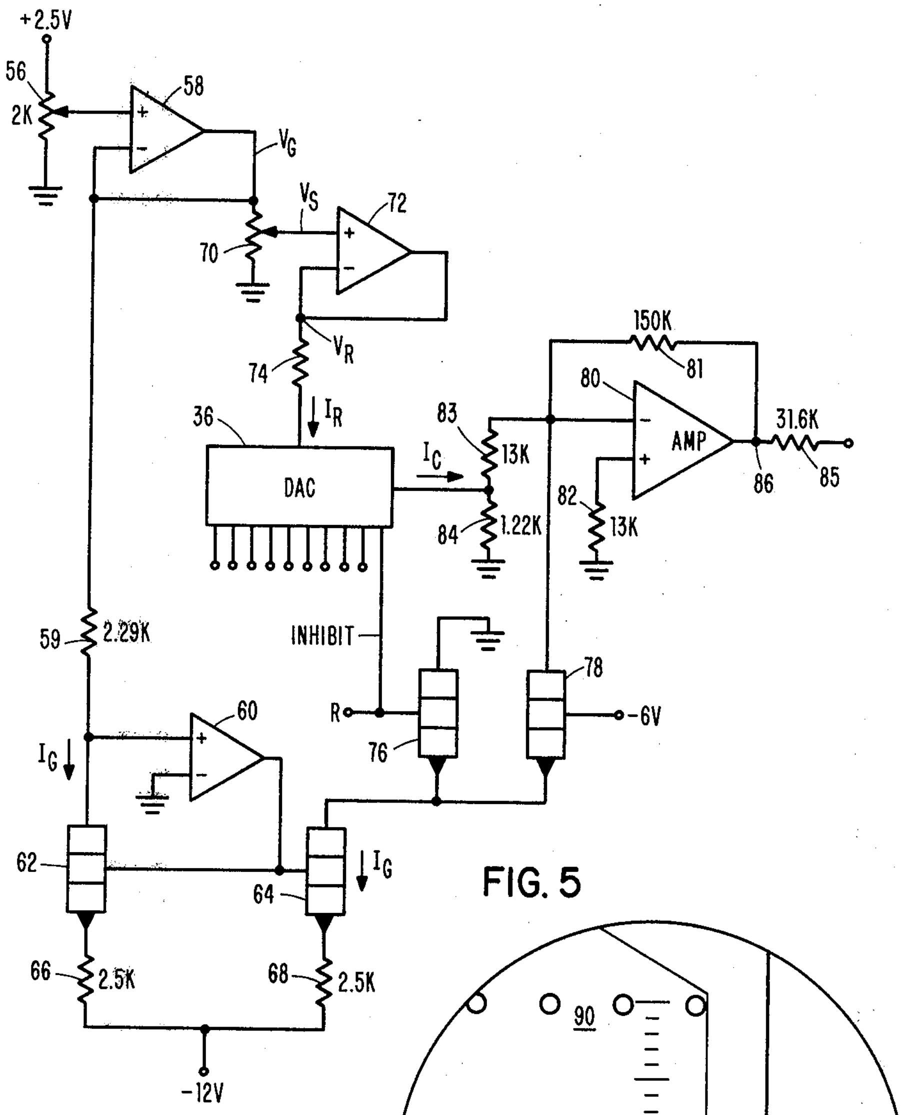
FIG. 4 shows apparatus to adjust the gutter voltage and print compensation voltage for environmental effects.

To understand the static adjustment for environmental effects, reference is now made to FIG. 4. FIG. 4 is a detailed circuit diagram showing the interconnection of the print reference level source 46, the gutter voltage source 42, the digital-to-analog converter 36, gate 40, and charge electrode amplifier 44 shown in FIG. 3. The adjustable gutter voltage source is made up of potentiometer 56, buffer amplifier 58, amplifier 60, and transistors 62 and 64. Amplifier 60 in combination with transistors 62 and 64 and resistors 66 and 68 forms a current mirror circuit. The print signal reference level source is made up of potentiometer 70 and buffer amplifier 72. The reference level voltage $V_R$ is converted to a reference current $I_R$ by resistor 74. The gate 40 from FIG. 3 is made up of transistors 76 and 78 connected in a Darlington circuit configuration. Finally, the charge electrode amplifier 44 of FIG. 3 is made up of amplifier 80 and resistors 81 through 84 in FIG. 4. Resistor 85 is merely a current limiting resistor between the voltage output of amplifier 80 and the charge electrode 18 of FIG. 1.

In operation, the gutter voltage is adjusted by adjusting potentiometer 56. Buffer amplifier 58 has a high input impedance and a gain of one so that its output is $V_G$, the gutter voltage reference level. The gutter voltage is converted to a current by the current mirror.

In the current mirror, transistors 62 and 64 are matched and resistors 66 and 68 are matched. Amplifier 60 will drive the bases of transistors 62 and 64 so that the positive terminal of amplifier 60 is held at ground. Thus, the $V_G$ drop across resistor 59 is converted to an $I_G$ reference current. Substantially all of this $I_G$ reference current passes through transistor 62 since the amplifier 60 has a high input impedance. With transistors 62 and 64 matched and resistors 66 and 68 matched, the $I_G$ current is mirrored though transistor 64.

The print signal reference level is derived from $V_G$ and may be changed by adjusting potentiometer 70. Buffer amplifier 72 has a high input impedance and a gain of one. Thus, the reference level $V_R$ in FIG. 4 is equal to the adjusted voltage from the potentiometer 70. This voltage from potentiometer 70 is the static environmental print reference level $V_S$. In FIG. 4, only the static level adjustment is provided for, and $V_R$ equals $V_S$.

The reference level $V_R$ is converted to a reference current $I_R$ by the resistor 74. This reference current $I_R$ provides the input signal to the digital-to-analog converter 36. The converter 36 will have an output current $I_C$ which is the compensation signal for print drops. $I_C$ is directly proportional to $I_R$ and the 9-bit digital value applied to the converter 36. Thus, the compensation value $I_C$ may be scaled by changing the value of $I_R$.

Whether the compensation current $I_C$ or the gutter reference current $I_G$ are applied to amplifier 80 depends upon the R-bit signal applied to the base of transistor 76. If the R-bit is representative of a binary "1" (print drop), the voltage level applied to the base of transistor 76 must be slightly more positive than the negative six volt signal applied to the base of transistor 78. Then transistor 76 is conductive and transistor 78 is cut off.

With transistor 78 cut off, the input to the negative terminal of the transimpedance amplifier 80 is the $I_C$ current divided down by the current divider formed by resistors 83 and 84. In this case, approximately 1/10 of $I_C$ is applied to the transimpedance amplifier 80. The gain factor of amplifier 80 between the input current to the negative terminal of the amplifier and the output voltage at node 86 is approximately the value of the resistor 81, i.e., a gain of 150 K.

When the R-bit represents a binary zero (gutter drop), the signal level applied to the base of transistor 76 is slightly more negative than the negative six volts applied to the base of transistor 78. In this case, transistor 78 is conductive and transistor 76 is cut off. Now the current applied to the negative input of transimpedance amplifier 80 is the gutter reference current $I_G$. There is no $I_C$ current applied to amplifier 80 because the signal level, applied to the base of transistor 76 to switch transistor 76 off, provides an inhibit signal to converter 36. Thus, there is no $I_C$ current out of converter 36 when transistor 78 is conductive. Transimpedance amplifier 80 then amplifies the current $I_G$ by the 150,000 gain factor to produce a gutter voltage at node 86 which will be applied to the charge electrode through the current limiting resistor 85.

Throughout the operation of the transimpedance amplifier 80, it is assumed that the positive and negative inputs of the amplifier 80 are at ground. However, the internal bias of amplifier 80 is such that a small current flows at these negative and positive terminals. Resistor 82 is provided as an impedance match for resistors 83 and 84 connected in parallel with resistor 81. Thus, any trickle of current in equal amounts at the negative and positive inputs of amplifier 80 will produce the same voltage at both inputs. Accordingly, resistor 82 is simply an impedance match to achieve a virtual ground at the positive and negative inputs of transimpedance amplifier 80.

Figure 5:
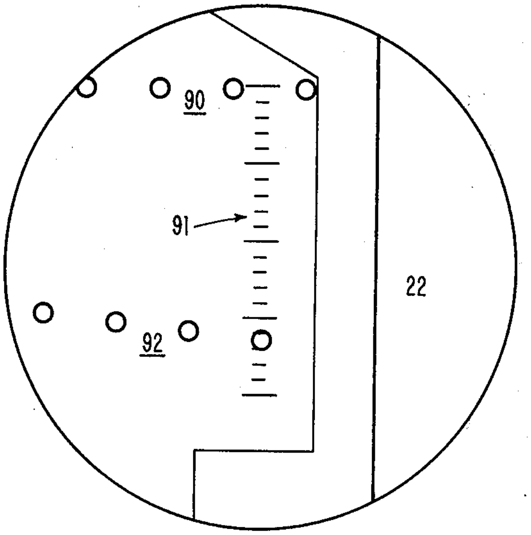
FIG. 5 is a pictorial representation of a microscopic observation of the ink streams when adjusting the gutter voltage.

To understand how the potentiometers 56 and 70 must be adjusted to correct for static environmental effects reference is now made to FIGS. 5, 6, 7, and 8. The adjustment of the gutter reference by adjustment of potentiometer 56 is made by an observer examining the ink stream with a microscope. FIG. 5 is a pictorial representation of two successive observations through the microscope. In a first observation, an undeflected ink stream is observed. In the second observation, the gutter signal is applied to the charge electrode 18 and all drops are deflected in accordance with the gutter signal.

During these observations, the gutter 22 is raised to a position such that all ink drops whether deflected or undeflected are caught by the gutter. The microscope is provided with a scale also pictorially represented in FIG. 5. The observer first observes the undeflected drop stream 90. The top-most position of the scale 91 is placed in alignment with the undeflected drop stream 90. Next, the observer observes a gutter deflected drop stream 92. As these drops in the gutter stream are observed, they should cross the scale at a predetermined position. If they do not, the observer adjusts potentiometer 56 until the gutter voltage is such that the gutter drop stream does cross the desired position on the scale 91.

The amount of separation between the gutter drop stream and the undeflected drop stream would be predefined in accordance with the design specifications upon which all of the aerodynamic compensation values in ROM 34 are based. In other words, the compensation values in ROM 34 represent empirical data collected when there was a given separation between the undeflected drop stream and the gutter drop stream. The observer adjusts potentiometer 56 after the machine is field installed so that the same predetermined separation results.

Figure 6:
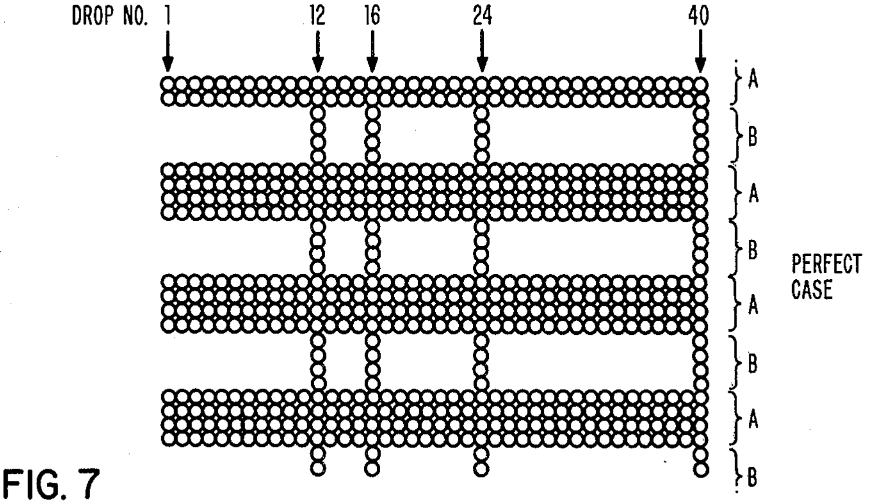
FIG. 6 is an example of a perfect print sample of a predetermined test pattern used when scaling the print compensation voltage.

After the gutter voltage has been adjusted, the print signal reference level must be adjusted. The printer is operated to print a predetermined pattern such as that shown in FIG. 6. The observer removes this printed page from drum 12 and examines the position of the print drops with a magnifying glass. The predetermined pattern consists of printing a string of 40 drops followed by printing a drop at the 12-th, 16-th, 24-th, and 40-th positions. A sole drop printed at the 40-th position, represents a worst case aerodynamic effect. The print sample in FIG. 6 represents perfect alignment. The 40-th position drops in segments A and B line up vertically. No adjustment of potentiometer 70 is necessary.

Figure 7:
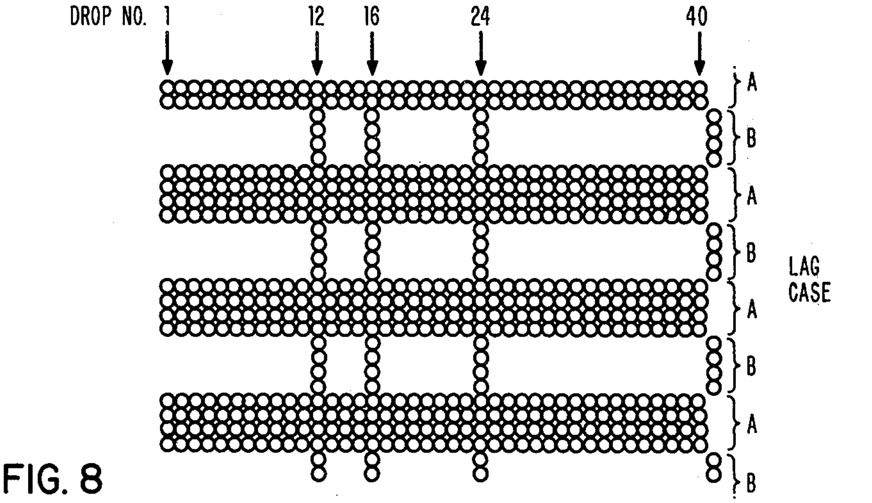
FIG. 7 is a print sample of the predetermined test pattern showing that the print compensation voltage must be scaled up.

In FIG. 7, which represents a lag case, the sole drops at areas B are to the right of the continuous drops at area A. In this case, the static print voltage reference level should be increased. Potentiometer 70 in FIG. 4 would be adjusted to increase $V_S$ and, thus, $V_R$.

Figure 8:
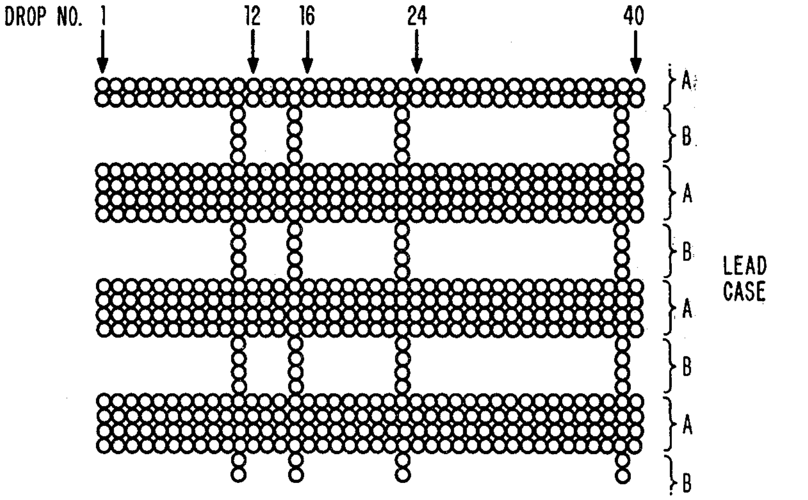
FIG. 8 is a print sample of the predetermined test pattern showing that the print compensation voltage must be scaled down.

In FIG. 8, the printed sample shows a lead case. In this sample, the sole print drops at areas B are to the left of the continuous drops at areas A. In this case, the compensation values should be scaled down. This is accomplished by adjusting potentiometer 70 to reduce the static print reference level $V_S$ and, thus, the reference level $V_R$ in FIG. 4.

The observer would continue to print samples such as FIGS. 7 and 8 until the adjustment of potentiometer 70 is such that a print sample as shown in FIG. 6 is achieved. This would complete the static adjustment for environmental effects including climate changes and manufacturing tolerances on parts.

Figure 9:
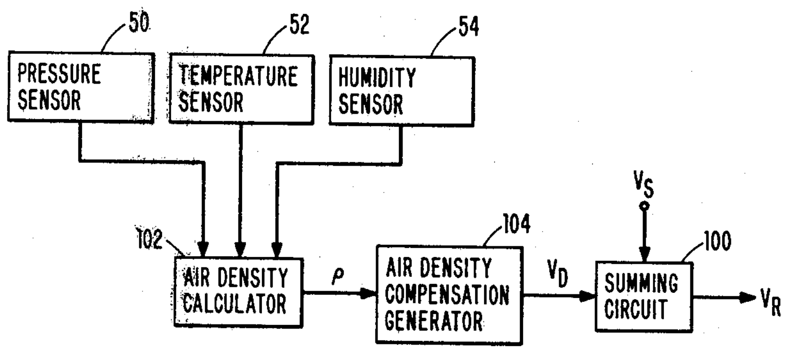
FIG. 9 shows apparatus to adjust the print compensation voltage for static and dynamic environmental effects.

As discussed earlier with reference to FIG. 3, the system also has the capability for automatically adjusting for dynamic environmental effects. Shown in FIG. 9 is the apparatus necessary to perform the dynamic adjustment of the scaling factor for the print drop compensation. The apparatus in FIG. 9 may be combined with the apparatus in FIG. 4 by adding the summing circuit 100 of FIG. 9 between buffer amplifier 72 and resistor 74 of FIG. 4. The dynamic environmental adjustment is based upon correcting the flight of the print drops for variations in air density.

The air density is calculated by calculator 102. The calculator monitors the output from pressure sensor 50, temperature sensor 52 and humidity sensor 54. The air density $\rho$ in pounds per cubic foot is computed in accordance with the following expression:

$$\rho = \frac{144P}{53.4(T + 460)(1 + 1.6078W)}$$

where P is the barometric pressure in pounds per square inch, T is the air temperature in degrees Fahrenheit and W is the humidity ratio (pounds/moisture per pound of dry air). The temperature T and the pressure P are directly available from the sensors 52 and 50, respectively. The humidity ratio W may be obtained by a table look-up procedure utilizing well-known data collected as a function of temperature and humidity. Examples of such data appear in the 1977 Fundamentals ASHRAE Handbook and Product Directory, published by the American Society of Heating, Refrigerating and Air-Conditioning Engineers, Inc., New York, N.Y.

The air density computed by calculator 102 is passed to the air density compensation generator 104. Generator 104 calculates the dynamic compensation voltage $V_D$ from the air density. The dynamic compensation voltage is given by the following expression:

$$V_D=(C-C_S)/D_S$$

Where $C_S$ is the static print correction distance in mils measured along the drum profile at the time of static adjustment. Print correction distance is the distance along the drum profile from impact point of a zero error print drop in a continuous stream to the impact point of an isolated drop corrected to produce no print error. $D_S$ is the correction deflection sensitivity of the printer in mils per volt of correction voltage. C is the current print correction distance for the actual air density and is given by the following expression:

$$C=6.443+100.02\rho$$

The above expression for C, the correction distance as a function of air density, is dependent upon the physical characteristic of the printer. Accordingly, it must be determined experimentally. The expression given above is based on a single nozzle printer operating with a nozzle diameter of 1 mil, a drop rate of approximately 100 kHz, a flight distance of approximately 700 mils, a drop spacing (in-flight distance between drops) of 8 mils and a 26 mil deflection separation between undeflected streams and gutter streams at the gutter. With a printer of a configuration different from the above, the equation for C is obtained by measuring print position error with various air densities.

The dynamic correction voltage is passed from generator 104 to the summing circuit 100. The summing circuit also receives the static reference voltage for the print drops $V_S$. As shown in FIG. 4, in a static situation, $V_S$ is derived from $V_G$ by the potentiometer 70 and the $V_R$ for the print drops is simply equal to $V_S$. In FIG. 9, the output $V_R$ of summing circuit 100 is given by the equation:

$$V_R=V_S+V_D$$

The output of summing circuit 100 is connected to resistor 74 in FIG. 4. With the apparatus in FIG. 9 connected into FIG. 4, the circuitry will scale the compensation of print drops not only for the static environmental effects but also for the dynamic environmental effects.

While we have illustrated and described the preferred embodiments of our invention, it is understood that we do not limit ourselves to the precise constructions herein disclosed and the right is reserved to all changes and modifications coming within the scope of the invention as defined in the appended claims.

What is claimed is:

1. In an ink jet printing process, using electromagnetic fields to control the flight path of the drop and having apparatus for correcting the flight path for drop interactive aerodynamic effects, a method for correcting the flight path of the ink drops for environmental aerodynamic effects, said method comprising the steps of:
   - setting the electromagnetic fields to maintain a predetermined separation between the flight path of the print drops and the flight path of the gutter drops;
   - printing a predetermined pattern corrected for drop interactive effects with the ink jet printer;
   - observing the alignment of drops printed in the predetermined pattern, errors in said alignment being indicative of environmental effects; and
   - adjusting the electromagnetic fields to change the flight path of the print drops to correct for errors in the print pattern due to the environment of the ink drops.

2. The method of claim 1 and in addition the steps of:
   - monitoring the environment of the ink drops; and
   - dynamically adjusting the electromagnetic fields to correct the flight of the print drops for changes in the desired flight path due to changes in the environment.

3. The method of claim 2 wherein said monitoring step senses the density of the air through which the ink drops fly.

4. The method of claim 3 wherein said dynamic adjusting step changes the electromagnetic fields as a function of air density to correct the ink drop flight path as it is distorted from the desired path by changes in air density.

5. Apparatus for correcting the flight path of drops in an ink jet printer to compensate for print errors caused by environmental effects, said printer having flight control means responsive to reference signals for controlling the flight of some ink drops along a path to a moving print medium and for controlling the flight of other ink drops along another path diverging from the print drop path, said correcting apparatus comprising:
   - means for storing an environmental reference signal, said signal being set in accordance with the effect of the environment on the flight of the print drop; and
   - means for modifying the flight path of the print drops by applying the stored reference signal to said flight control means when said control means is controlling ink drops on the print drop flight path.

6. The apparatus of claim 5 and in addition:
   - means for sensing variations in air density; and
   - means for changing said reference signal in accordance with the variations in air density.

7. The apparatus of claim 5 and in addition:
   - means for adjusting the flight path of the gutter drops to a predetermined separation from the flight path of the print drops.

8. The apparatus of claim 5 wherein said storing means comprises:
   - means for generating a static scaling factor representative of nominal correction of the print drop flight path for static environmental conditions such as climate and manufacture tolerances on the printer;
   - means for generating a dynamic scaling factor representative of corrections of the print drop flight path for changes in the environmental conditions from the static conditions; and
   - means for combining the static and dynamic scaling factors into a single scaling factor reference signal for said modifying means.

9. The apparatus of claim 8 and in addition:
   - means for generating a compensation signal to correct the flight path of the ink drops for drop interactive effects; and
   - said modifying means applying said combined scaling factor to said compensation signal whereby the flight path of the ink drops is corrected for drop interactive effects as well as environmental effects.

10. Apparatus for correcting the flight path of drops in an ink jet printer to compensate for print errors caused by drop interactive and environmental aerodynamic effects, said printer having flight control means for the drops for controlling the flight path of the ink drops, said correcting apparatus comprising:
   - means for compensating the flight control means to correct the trajectory of the ink drops for drop interactive effects; and
   - means for scaling the compensation, provided by said compensating means to the flight control means, to correct the trajectory of the ink drops for environmental effects in addition to the drop interactive effects.

11. The apparatus of claim 10 and in addition:
   - means for adjusting said scaling means to a predetermined correction factor for correcting the trajectory of the ink drops for static environmental effects including climate or printer component variation.

12. The apparatus of claim 11 and in addition:
   - means for detecting changes in the environment of the ink drops; and
   - means for dynamically adjusting said scaling means for correcting variations in the trajectory of the ink drops from the predetermined static corrected trajectory.

13. The apparatus of claim 10 wherein said compensating means generates a correction signal for the flight control means to correct the flight path of the ink drops, said correction signal being based upon the charge interaction and aerodynamic interaction of the ink drops.

14. The apparatus of claim 13 wherein said scaling means scales the correction signal generated by said compensating means in accordance with a scaling factor based upon environmental conditions such as climate so that the flight path of the ink drops is corrected for the environment through which the ink drops fly as well as the drop interactive effects.

15. The apparatus of claim 14 and in addition:
   - means for generating a static scaling factor for use by said scaling means in correcting the flight path of the print drops under initial environmental conditions;
   - means for detecting the environmental conditions as they change from the initial environmental conditions;

means for generating a dynamic scaling factor which varies as the environmental conditions change as detected by said detecting means; and means for combining the static scaling factor and the dynamic scaling factor into a single scaling factor for use by said scaling means.

16. Apparatus for correcting the flight path of drops in an ink jet printer to dynamically compensate for print errors caused by continuously changing environmental effects, said printer having flight control means for the drops for directing the print drops on a print path to a moving print medium and for directing gutter drops on a gutter drop path diverging from the print drop path, said correcting apparatus comprising:

means for monitoring the continuously changing environmental effects; and means reponsive to said monitoring means for adjusting said flight control means as the environment of the ink drops change so that the flight path of the ink drops is dynamically corrected to eliminate print errors due to environmental effects.

17. The apparatus of claim 16 wherein said monitoring means senses the air density.

18. The apparatus of claim 17 wherein said adjusting means comprises:

means responsive to sensed air density for generating a correction signal that varies as the air density changes; and said flight control means responsive to said correction signal for altering the flight path of the ink drops in response to the correction signal to eliminate print errors caused by changes in air density.

19. The apparatus of claim 16 wherein said monitoring means comprises:

means for sensing air pressure;

means for sensing air temperature;

means for sensing humidity; and means for calculating the air density from the sensed pressure, temperature and humidity.

20. The apparatus of claim 19 wherein said adjusting means comprises:

means responsive to the calculated air density for generating a correction signal that varies as the air density changes; and said flight control means responsive to said correction signal for altering the flight path of the ink drops in response to the correction signal to eliminate print errors caused by changes in air density.

* * * * *